May 5, 1959
R. L. ALDREDGE ET AL
2,885,101
MATERIAL HANDLING DEVICE
Filed Jan. 19, 1955
2 Sheets-Sheet 1
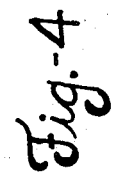
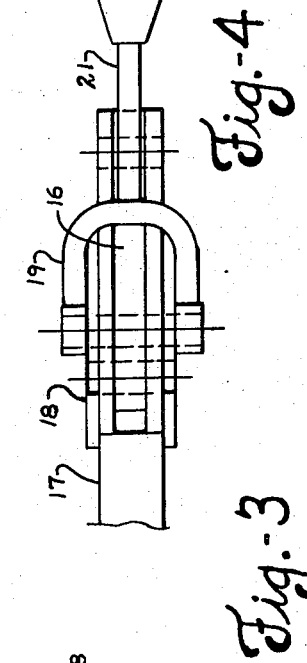
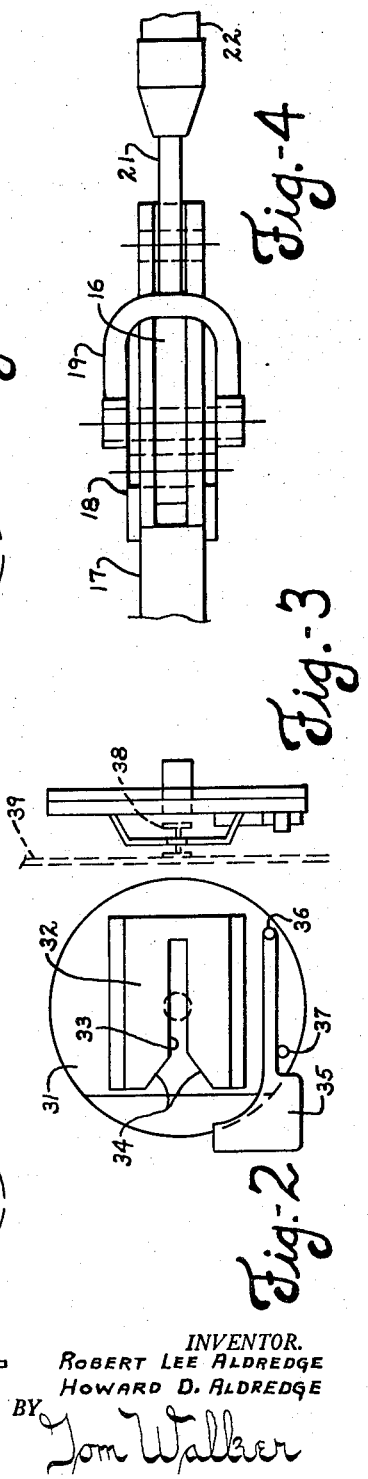
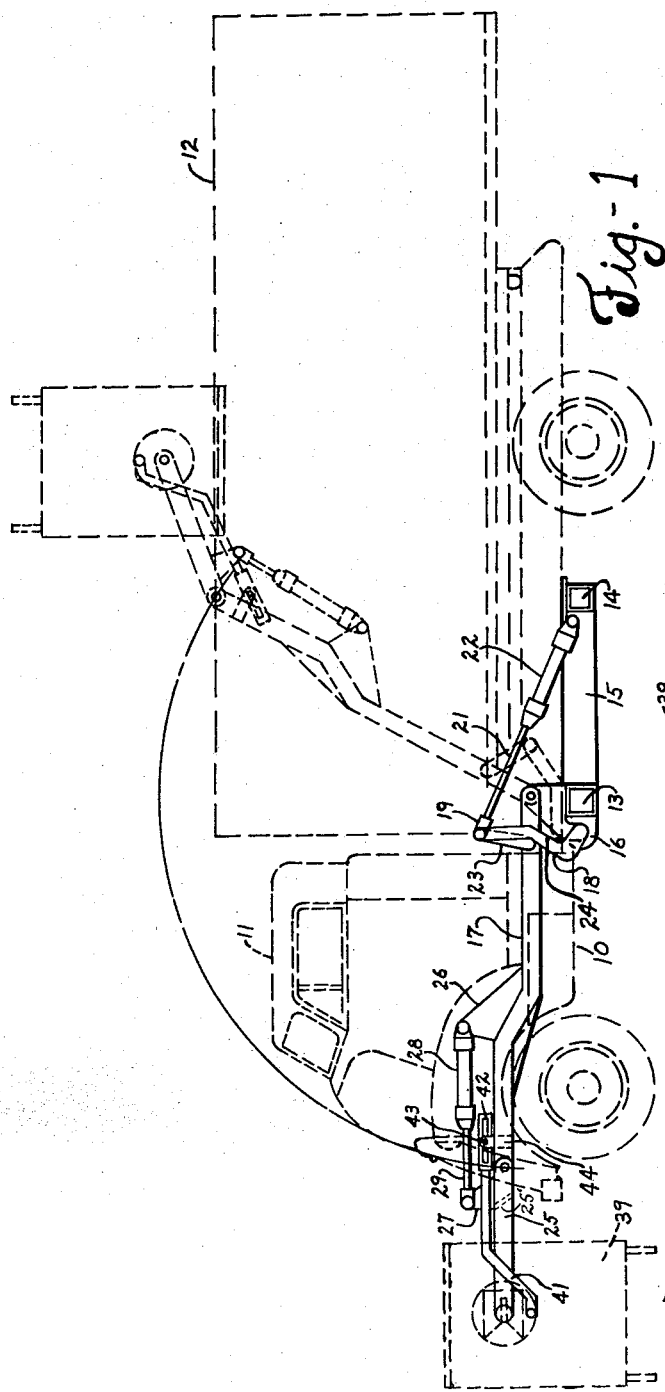
INVENTOR.
ROBERT LEE ALDREDGE
HOWARD D. ALDREDGE
BY Tom Walker May 5, 1959  R. L. ALDREDGE ET AL  2,885,101
MATERIAL HANDLING DEVICE Filed Jan. 19, 1955  2 Sheets-Sheet 2

INVENTOR.
ROBERT LEE ALDREDGE
HOWARD D. ALDREDGE
BY Tom Walker

United States Patent Office 2,885,101
Patented May 5, 1959

2,885,101

MATERIAL HANDLING DEVICE

Robert Lee Aldredge and Howard D. Aldredge, Dayton, Ohio, assignors to Container Service Company, Dayton, Ohio, a corporation of Ohio Application January 19, 1955, Serial No. 482,824

9 Claims. (Cl. 214—302)

This invention relates to material handling apparatus, and particularly to self contained apparatus in a truck or the like for loading of the truck.

The purpose of the invention is to provide for self loading of a truck, and particularly front end self loading. While the invention has general utility, it is particularly adapted to material collecting systems in which a truck travels from point to point, stopping at each point for the emptying of containers into the truck body. In a trash collecting system, for example, refuse filled containers are set out at various points along a route followed by the truck, with stops being made at each point for the refuse containers to be emptied into the truck and replaced at their stations on the ground.

The instant invention has in view a system in which the container can be engaged by the material handling apparatus on the truck, lifted from the ground, emptied into the truck, and replaced on the ground and disengaged from the material handling apparatus, all in a substantially automatic manner under the control of a single operator who never need leave the cab of the truck.

The object of the invention is to simplify the construction as well as the means and mode of operation of material handling apparatus as disclosed herein, whereby such apparatus may not only be economically manufactured, but will be more efficient and satisfactory in use, adaptable to a wide variety of applications and be unlikely to get out of repair.

Another object of the invention is to present a generally new combination of truck, loading apparatus on the truck, and a container or receptacle constructed and arranged for cooperative relationship with the material loading apparatus on the truck.

A further object of the invention is to provide a simplified means of connecting and disconnecting the container and lifting apparatus on the truck, involving merely the advancing of the truck upon the container to effect the necessary connection and the withdrawing of the truck in the opposite direction to effect a disconnecting of the parts.

Still another object of the invention is to present a generally simplified means of lifting and emptying the container into the truck, including the use of controls for tilting the container relative to the lifting apparatus at a predetermined point in the movement of the lift apparatus.

A further object of the invention is to provide material handling apparatus possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings, wherein is found one, but obviously not necessarily the only form of embodiment of the invention, Fig. 1 is a view in side elevation of material handling apparatus in accordance with the illustrated embodiment of the invention, shown installed on a truck and in cooperative relation with a container constructed for cooperation with such apparatus;

Fig. 2 is a detail view in side elevation of a mounting assembly on the lifting apparatus directly engageable with the container;

Fig. 3 is a front end view of the assembly of Fig. 2, shown in cooperative relation with a part of the container;

Fig. 4 is a detail view in top plan of a part of the lift apparatus;

Like parts are indicated by similar characters of reference throughout the several views.

Figure 5:
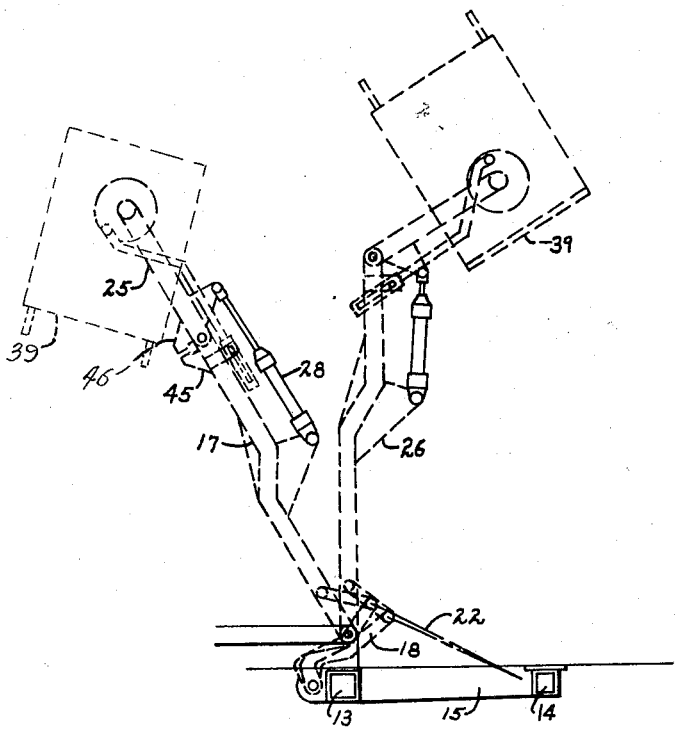
Fig. 5 is a detail view in side elevation of the lift apparatus, indicating the position thereof at different points in its travel.
Figure 6:
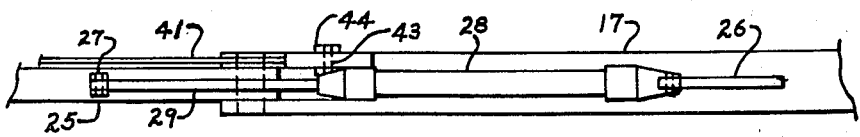
Fig. 6 is a detail view in top plan of one lift arm comprised in the lift apparatus and an extension thereof.

Referring to the drawings, a truck 10 has a cab 11 and a body 12. The body 12 is of the open top type and may further be mounted on the truck for tilting adjustment to discharge contained material out the back end thereof.

In accordance with the instant illustrated embodiment of the invention there is secured to the frame of the truck, on the under side thereof, a pair of cross beams 13 and 14, and these may be interconnected in a suitable frame 15. The beams 13 and 14 mount the lifting apparatus, which is made up of two sets of substantially identical linkage on opposite sides of the truck. For convenience of illustration, the linkage on one side only will be described.

Thus, there is mounted on the beam 13, near one end thereof, a plate 16 approximately triangular in shape. At the upper end or apex of the plate 16 is pivotally connected one end of a lift arm 17 which extends forwardly from the frame plate 16 toward the front end of the truck. Also pivotally connected to the frame plate 16, near the base end thereof, is one end of a link 18, the opposite end of the link 18 being pivotally connected to a yoke 19 on the outer free end of a rod 21 extending from a hydraulic cylinder 22. The rod 21 and cylinder 22 extend rearwardly toward the beam 14 and the cylinder is pivotally connected to the framework 15. The yoke 19 is also connected, as by a link 23, with the lift arm 17.

As will be understood, the rod 21 is extensible and retractable in the cylinder 22 under suitable remote control, and the described construction and arrangement of parts is such that actuation of the cylinder controls is effective to raise the arm 17 from the position shown in full lines in Fig. 1 to the extreme elevated position shown in dotted lines therein, or to any intermediate position, and to return the arm back to the full line position. The link 18 is formed angularly to present a surface 24 which in the extreme elevated position of the parts shown in dotted lines in Fig. 1 engages and rests on the beam 13 and thus relieves the cylinder mechanism from the full weight of the elevated parts.

At its forward end the lever 17 has pivotally connected thereto an extension arm 25. Upstanding ears 26 and 27 on the arm 17 and extension 25 provide connection points for opposite ends of a hydraulic piston-cylinder assembly including a cylinder 28 and a piston rod 29 extensible and retractable in the cylinder. The piston-cylinder combination provides a substantially rigid connection between the arm 17 and extension 25 but is adjustable under remote control to cause the extension 25 to tilt relatively to the arm 17. It will be understood, in this connection, that the arm 25 may be caused to tilt relatively to the arm 17 in either direction.

On the inside surface of the outer free end of the extension arm 25 is pivotally mounted a disc plate 31. The inside face of the disc 31 in turn mounts a plate 32 formed with a longitudinal slot 33 opening through one end of the plate, the open end of the slot 33 being expanded by sloping guide surfaces 34. Also mounted on the inside face of the disc 31 is a latch member 35 pivotally connected at 36 to the disc 31 and normally resting on a stud 37 set in the disc 31, in the position shown in Figure 2. The head of the latch 35 is relatively heavy and it will be understood that a clockwise movement of the disc 31 relative arm 17 and with arm 25 will result in a swinging movement of the latch 35 across the open front of the slot 33 in a manner to be further described herein.

The slot 33 is interengageable with an "I" beam mounted on the sides or ends of a container 39, the beam 38 and slot 33 defining in effect a tongue and groove connection the making of which interengages the container 39 with the lift apparatus on the truck.

There is further connected to the disc 31, on the outer face thereof, one end of a link 41, the other end of which is formed with a slot 42 receiving a pin 43 in a bracket 44 made fast to the arm 17. The connection afforded is such as to permit the disc 31 a limited amount of rotary motion relative to the arm 17.

In the operation of the materials handling apparatus the truck is advanced upon a container 39 in a manner to bring the container between the parallel pair of extension arms 25. The pair of discs 31, in this connection, have a part of their front edges bent divergently backward in order to align the container and extension arms into proper relative positions. As the container is received between the extension arms 25 the "I" beam on either side of the container enters slot 33 in the respective plates 32. When this connection has been made the operator actuates a first hydraulic control to retract the rod 21 into the cylinder 22 whereby to raise the lift arms 17. The extension arms 25, being rigidly connected to the arms 17 through the pistons 29 and cylinders 28, the arms 25 and supported container 39 are carried upward with the arms 17 in the general path of the dotted line in Fig. 1 over the cab 11 of the truck to an overlying position with respect to the body 12.

As shown in Fig. 5, as the lift apparatus approaches the rearmost position illustrated in overlying relation with respect to the body 12, the operator actuates a second hydraulic control, retracting the piston rod 29 in the cylinder 28 to buckle the joint between the arm 17 and the extension 25 and thereby to tilt the container 39 more sharply toward the open top body 12. Also in this part of the motion of the lift apparatus the movement of disc 31 with arm 25 causes the latch 35 to drop as before described to a position in front of the slot 33, inhibiting accidental disengagement of the container from the grip of the opposing discs 31.

Still further, in the initial part of the raising of the lift arms 17 the container 39 is permitted to hang in a substantially vertical position, this being made possible by the lost motion connection afforded by the slot 42 and stud 43. The discs 31 turn relatively to the arms 17 while such vertical position of the container 39 is being maintained, but at about the same time that the extension arms 25 are independently actuated, the left hand end of the slot 42 abuts stud 43 to prevent further relative movement of the discs 31. As the arms 17 continue their rearward movement, accentuated by a further rocking motion of the extension arms 25, the link 41 reacts upon stud 43 to prevent the discs 31 from following this motion with the result that an additional tilting leverage is gained upon the container 39 substantially inverting it to the position shown in dotted lines in Fig. 1 by the time the lift apparatus reaches its extreme rearward position in elevation.

The container 39 is returned to the ground by a reversal of the above operations, and, as the container is moved back to an upright position, the latches 35 drop by gravity back to the normal ineffective position of Fig. 2. Disengagement of the "I" beams 38 from the slots 33 is effected by backing the truck away from the container.

The extension arms 25 can be tilted relatively to the arms 17 at any time, as for example to enable the operator sitting in the cab of the truck to look into the interior of the container. Also, the extension arms can be tilted in the opposite direction or downward and used in this position for another type of work. Thus, the extension arms might be connected in this position to a shovel and the material handling apparatus used for excavating or for the loading of loose material lying on the ground. In the interest of absorbing axial thrusts, when the apparatus is so used, each arm 17 and its associated extension 25 are formed with adjacent complementary abutments 45 and 46 engageable with one another when the extension arms 25 are tilted downward and relieve the cylinder 28 and rod 29 of involved thrusts.

The member 25' (shown in dotted lines in Fig. 1) is a transverse tie member. This member is preferably welded to the arm 25 on the inside thereof and extends transversely across the truck into engagement with the corresponding arm 25 on the opposite side of the truck to which it is likewise preferably welded. Such transverse arm 25' maintains the two forwardly extending arms 25 in substantial alignment with one another and prevents a twisting or turning of the arms 25 as they are elevated up and over the truck in the event that the container 39 might be unevenly loaded.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. Material handling apparatus for the front end self loading of a truck, including a truck having a cab and an open top body rearwardly of the cab, lift arms on opposite sides of the truck and pivotally connected thereto at their one ends, the opposite ends projecting forwardly alongside said cab and beyond the front end thereof, container mounts pivotally connected to the said opposite ends of said arms, having normally horizontally disposed slide engagement means fixed thereto, a container having horizontally extending, externally projecting portions rigidly and slidably engageable by said mounts, means for raising said lift arms to bring said container over said cab to a position overlying said body, and means utilizing the latter part of such movement to tilt said container, said last named means including linkage between said lift arms and said container mounts limiting pivotal movement of said container mounts relatively to said lift arms.

2. Material handling apparatus for the self loading of a truck, including truck lift arms pivotally connected at their one ends to said truck, container mounts pivotally connected to the opposite ends of such arms, a container having externally projecting portions rigidly engageable by said mounts, means for raising said lift arms to bring said container to a position overlying said truck, and linkage interconnecting said container mounts to said lift arms for holding said mounts against motion relative to the lift arms, said linkage including a lost motion connection rendering said linkage ineffective during a part of the raising of said lift arms.

3. Material handling apparatus for the front end self loading of trucks, including lift arms pivotally mounted at their one ends on the truck on opposite sides thereof and extending toward the front end of the truck, extension arms pivotally connected at their one ends to the opposite ends of said lift arms and being movable by advance of the truck upon a container apart from the truck into direct straight line embracing relation at their opposite ends with the container, means for connecting the said extension arms in supporting relation to the container, means for raising and lowering said lift arms, and means for rocking said extension arms relatively to said lift arms and means connecting said container support means and lift arms limiting relative movement thereof during rocking of said extension arms and providing a tilting leverage on said container in the process.

4. Material handling apparatus for the front end self loading of trucks, including lift arms pivotally mounted at their one ends on the truck on opposite sides thereof and extending toward the front end of the truck, extension arms pivotally connected at their one ends to the opposite ends of said lift arms having means pivotally connected at their extremities for normal horizontal slide engagement with opposite side portions of a container apart from the truck into embracing relation at their opposite ends with the container, an extensible and retractable rigid connection between said lift arms and said extension arms, operable to tilt said extension arms relatively to said lift arms, means for raising and lowering said lift arms and said extension arms as a unit and means connected between said lift arms and said pivotally connected means on said extension arms inhibiting relative movement therebetween on tilting of said extension arms providing a supplemental tilting leverage on the container during tilting of said extension arms relative to said lift arms.

5. Material handling apparatus according to claim 4, characterized by means for limiting said relative tilting motion of said extension arms in at least one direction.

6. Material handling apparatus according to claim 4, characterized by means for limiting motion of said lift arms in at least one direction.

7. Material handling apparatus for the front end self-loading of trucks, including lift arms pivotally mounted at their one ends on the truck on opposite sides thereof and extending toward the front end of the truck, extension arms pivotally connected at their one ends to the opposite ends of said lift arms and being movable by advance of the truck upon a container apart from the truck into embracing relation at their opposite ends with the container, container mounts relatively rotatably supported on the said opposite ends of said extension arms and adapted for engagement with the container, means for raising and lowering said lift arms and said extension arms as a unit, and linkage extending between and interconnecting said lift arms and said container mounts embodying a lost motion connection for limiting rotary motion of said container mounts relatively to said lift arms.

8. Material handling apparatus according to claim 7, characterized by means for tilting said extension arms relatively to said lift arms.

9. Material handling apparatus for the front end self loading of a truck, including lift arms mounted on the truck on opposite sides thereof and extending forwardly of the truck, a container standing apart from the truck and received between forwardly extending ends of the arms by advance of the truck on said container, cooperating normally horizontally disposed tongue and groove means on said container and on said arms horizontally interengaged by the described advance of the truck and disengaged by an opposite motion of the truck, means for raising the lift arms to a position overlying the truck body, and latch means pivotally connected relative said groove means and operative by gravity, including a freely swingable latch member pivotally connected to the container support, a stop means to cause said latch means to move with said container support on rotation of the latter until the center of gravity of said latch means is forwardly of the axis of rotation of said container support whereby said latch means swings freely to a position obstructing the groove means.

References Cited in the file of this patent
UNITED STATES PATENTS

| | | |
|---|---|---|
| 2,020,231 | Bell | Nov. 5, 1935 |
| 2,393,877 | Baldwin | Jan. 29, 1946 |
| 2,441,591 | Owen | May 18, 1948 |
| 2,624,478 | Kaplan | Jan. 6, 1953 |
| 2,699,876 | Smith | Jan. 18, 1955 |
| 2,744,642 | Sewell et al. | May 8, 1956 |

FOREIGN PATENTS

| | | |
|---|---|---|
| 25,932 | Australia | Nov. 5, 1930 |